United States Patent
Agarwal et al.

(10) Patent No.: US 10,459,997 B1
(45) Date of Patent: Oct. 29, 2019

(54) RANKING SEARCH RESULTS BASED ON MEMBERS? POSTING ACTIVITY AND CONTENT

(71) Applicant: Microsoft Technology Licensing, LLC, Redmond, WA (US)

(72) Inventors: Rahul Agarwal, Sunnyvale, CA (US); Alexandre Lee, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 15/705,109

(22) Filed: Sep. 14, 2017

(51) Int. Cl.
  *G06F 17/30* (2006.01)
  *G06F 16/9535* (2019.01)
  *G06F 16/9038* (2019.01)

(52) U.S. Cl.
  CPC ...... *G06F 16/9535* (2019.01); *G06F 16/9038* (2019.01)

(58) Field of Classification Search
  CPC .................................................. G06Q 30/0269
  USPC ....................................... 707/732; 705/14.66
  See application file for complete search history.

(56) References Cited

U.S. PATENT DOCUMENTS

| 7,844,668 B2 * | 11/2010 | Canning | H04L 67/32 709/206 |
| 9,319,479 B2 * | 4/2016 | Canning | H04L 67/32 |
| 10,257,155 B2 * | 4/2019 | Canning | H04L 67/32 |
| 2006/0036685 A1 * | 2/2006 | Canning | H04L 67/32 709/204 |
| 2011/0131283 A1 * | 6/2011 | Canning | H04L 67/32 709/206 |
| 2015/0317668 A1 * | 11/2015 | Tietzen | G06Q 30/0239 705/14.39 |
| 2016/0197879 A1 * | 7/2016 | Canning | H04L 67/32 |

* cited by examiner

Primary Examiner — Baoquoc N To
(74) Attorney, Agent, or Firm — Schwegman Lundberg & Woessner, P.A.

(57) ABSTRACT

Systems and methods for ranking search results based on members' posting activity and content are disclosed. The social networking system receives a search request for at least one member profile and retrieves member profiles in response to the search request. For a member profile in the member profiles, the social networking system identifies at least one submitted content item associated with the member profile and analyzes the at least one submitted content item to determine topics associated with the at least one submitted content item. The social networking system generates a topic similarity score for the member profile based on a comparison of the topics and a topic of interest associated with the search request. The social networking system ranks the member profiles based on generated topic similarity scores. The social networking system selects at least one member profile based on the member profile ranking.

18 Claims, 12 Drawing Sheets

RANKING SEARCH RESULTS BASED ON MEMBERS? POSTING ACTIVITY AND CONTENT

TECHNICAL FIELD

The disclosed example embodiments relate generally to the field of computer-implemented searching algorithms and, in particular, to ranking search results based on members' posting activity and content.

BACKGROUND

The advent of new computer technologies and networks has greatly improved connections between computer users, especially in the world of sales and commerce. Sales professionals (e.g., people or companies that derive their income from selling goods or products to other individuals or companies) rely on finding new customers to grow and develop both their own careers and the companies they work for.

Currently, various methods exist for improving the accuracy of such searches, allowing for improved efficiency for members who search through the system. Some methods include tracking member activity to determine what content a particular member prefers and presenting similar content. For example, a member's activity on a social network can be tracked to determine frequent purchases of an item from a particular vendor and present similar items to a user or similar vendors. However, similarities between content items are many times insufficient to make more nuanced recommendations to members. For the sales use case, the insights derived from the types of content being created and shared on a social network can be used to infer the buying intent of members, enabling sales professionals to reach out to potential leads at the precise moment when these buying signals occur and when the content items relate to the good and services being offered.

DESCRIPTION OF THE DRAWINGS

Some example embodiments are illustrated by way of example and not limitation in the figures of the accompanying drawings.

Like reference numerals refer to corresponding parts throughout the drawings.

DETAILED DESCRIPTION

Figure 1:
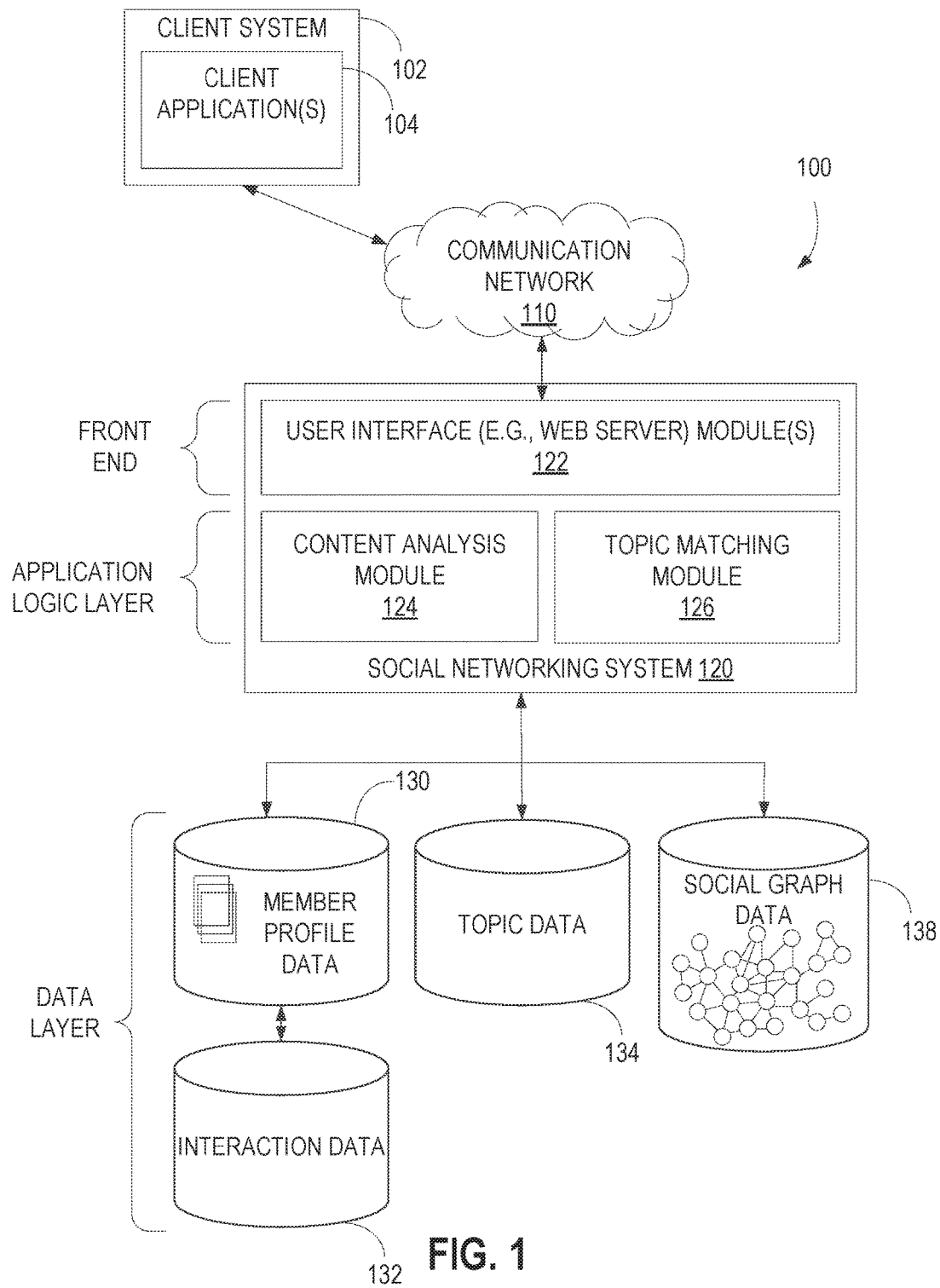
FIG. 1 is a network diagram depicting a client-server system that includes various functional components of a social networking system, in accordance with some example embodiments.

The present disclosure describes methods, systems, and computer program products for ranking search results based on activity and posting of the members of a social networking system. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

One potential application of social networks is to enable sales personnel to identify potential clients (e.g., members of the social network who the sales person can contact as a potential client). One method for enabling this application is to allow members to search within the member profiles of the social network to identify the member profiles of potential clients.

In some example embodiments, a search for potential clients is improved by analyzing content that members interact with on the social network. Specifically, members have the ability to post and interact with content items on the social networking system. For example, a member can post or share an article on a topic that the member is interested in or for which the member has expertise.

Thus, the searching member can identify a topic of interest that is related to the type of client that the searching member is interested in. In some example embodiments, the searching member submits a word (or group of words) as a search query that is associated with topics of interest to the searching member.

Once a topic has been identified (either by submission from the requesting or searching member or based on an analysis of the searching member's existing preferences) the social network identifies content items that each member has submitted to the social networking system (or other interactions). In some example embodiments, content submissions include posts and articles that a member has posted or shared on the social networking system. In some embodiments, an additional influence score is calculated based on the likelihood that a member submitting content is identified as a decision maker.

The social networking system (e.g., the social networking system 120 in FIG. 1) then analyzes each content submission to determine one or more topics associated with the content submission. In some example embodiments, the social networking system categorizes each word in the content submission. Based on the frequencies of words in a given content submission or post, the social networking system can identify words that are unusually common (e.g., a higher frequency than expected). Based on the identified words, the social networking system can use a lookup table (or other method) to identify one or more topics associated with a particular content submission.

In some example embodiments, the social networking system can rank (or re-rank) the identified member profiles (e.g., the initial search results) based on the number and quality of submitted content. In some example embodiments, the quality of submitted content can be determined by the number of members who view, like, comment, share, or otherwise interact with the content.

In some example embodiments, the social networking system selects at least one member profile based on the rankings. In this way the set of member profile search results can be refined based on a given keyword, search query, or topic of interest for a member. In some example embodiments, the selected at least one member profiles are transmitted to the requesting member.

FIG. 1 is a network diagram depicting a client-server system environment 100 that includes various functional components of a social networking system 120, in accordance with some example embodiments. The client-server system environment 100 includes one or more client systems 102 and the social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and receive requests to and from the social networking system 120 and to display information received from the social networking system 120.

In some example embodiments, the client system 102 includes an application specifically customized for communication with the social networking system 120 (e.g., a LinkedIn iPhone application). In some example embodiments, the social networking system 120 is a server system that is associated with one or more services.

In some example embodiments, the client system 102 sends a search request to the social networking system 120 for a list of member profiles that matched the sending member's requirements. For example, a member uses the client system 102 to log into the social networking system 120 and request information on members that meet certain specifications (e.g., for the purpose of generating leads). In response, the client system 102 receives a list of members that meet the requirements of the sending member and displays the list in a user interface on the client system 102.

In some example embodiments, as shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the social networking system 120 is depicted in FIG. 1 as having a three-tiered architecture, the various example embodiments are by no means limited to this architecture.

As shown in FIG. 1, the front end consists of a user interface module (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the social networking system 120, including member profile data 130, interaction data 132, topic data 134, and social graph data 138, which is data stored in a particular type of database that uses graph structures with nodes, edges, and properties to represent and store data. In various alternative example embodiments, any number of other entities might be included in the social graph (e.g., companies, organizations, schools and universities, religious groups, non-profit organizations, governmental organizations, non-government organizations (NGOs), and any other group) and, as such, various other databases may be used to store data corresponding with other entities.

Consistent with some example embodiments, when a person initially, registers to become a member of the social networking system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 includes or is associated with the interaction data 132. In other example embodiments, the interaction data 132 is distinct from, but associated with, the member profile data 130. The interaction data 132 stores data detailing the various interactions each member has through the social networking system 120. In some example embodiments, interactions include posts, likes, articles, messages, adding or removing social contacts, invitations, connections, sales, purchases, profile views, sales lead saves, and adding or removing member content items (e.g., a message or the like), while others are general interactions (e.g., posting a status update) and are not related to another particular member. Thus, if a given interaction is directed towards or includes a specific member, that member is also included in the interaction record.

In some example embodiments, topic data 134 includes information that relates keywords (e.g., keywords identified from articles or other content) to specific topics (e.g., consumer electronics, forestry). In some example embodiments, the topic data 134 includes a lookup table that associates specific words with particular topics. In other example embodiments, the topic data 134 uses a Bayesian model to associate particular words in a content item with one or more particular topics.

Once registered, a member may invite other members, or be invited by other members, to connect via the social networking system 120. A "connection" may include a bilateral agreement by the members, such that both members acknowledge the establishment of the connection. Similarly, in some example embodiments, a member may elect to "follow" another member. In contrast to establishing a "connection," the concept of "following" another member typically is a unilateral operation and, at least in some example embodiments, does not include acknowledgement or approval by the member that is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are represented in the social graph data 138.

The social networking system 120 may provide a broad range of other applications and services that allow members the opportunity to share and receive information, often customized to the interests of the member. In some example embodiments, the social networking system 120 may include a photo sharing application that allows members to upload and share photos with other members. As such, at least in some example embodiments, a photograph may be a property or entity included within a social graph. In some example embodiments, members of the social networking system 120 may be able to self-organize into groups, or interest groups, organized around a subject matter or topic of interest. In some example embodiments, the data for a group may be stored in a database. When a member joins a group, his or her membership in the group will be reflected in the member profile data 130, the interaction data 132, the topic data 134, and the social graph data 138.

In some example embodiments, the application logic layer includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the social networking system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A content analysis module 124 or a topic matching module 126 can also be included in the application logic layer. Of course, other applications or services that utilize the content analysis module 124 or the topic matching module 126 may be separately implemented in their own application server modules.

As illustrated in FIG. 1, in some example embodiments, the content analysis module 124 and the topic matching module 126 are implemented as services that operate in conjunction with various application server modules. For instance, any number of individual application server modules can invoke the functionality of the content analysis module 124 and the topic matching module 126. However, in various alternative example embodiments, the content analysis module 124 and the topic matching module 126 may be implemented as their own application server modules such that they operate as standalone applications.

Generally, the content analysis module 124 identifies content contributions that a particular member has submitted to the social networking system 120. In some example embodiments, the content analysis module 124 then determines the topics associated with each article (or other content) submitted to the social networking system 120. In some example embodiments, the content analysis module 124 identifies a list of words that occur in the article, comment, or post.

In some example embodiments, the list of words is then transmitted to the topic matching module 126. In some example embodiments, the topic matching module 126 uses the list of words to identify one or more topics associated with a particular content item or group of content items. As noted above, the topic matching module 126 can calculate inverse word frequencies to identify key words that appear at a higher than expected rate in a given document. Those keywords can then be used in a lookup table to identify topics. In other example embodiments, the list of keywords can be the input to a model that identify topics associated with the input keywords.

In some example embodiments, once topics have been identified based on the content submissions of a given member, the social networking system 120 can use the identified topics to rank a list of member profiles based on the interests of the searching member.

In some example embodiments, a list of member profiles has been identified based on the characteristics of the members. For example, a sales member may be interested in members who have particular characteristics in common with their sales targeting criteria (e.g., location, experience; past work history, similar education background, connections in common, and so on). In some example embodiments, the searching member explicitly determines which characteristics are important. In other example embodiments, the social networking system 120 determines the list based on analysis of the member's information or past behavior (e.g., what criteria the member has used in the past or what member profiles have been viewed and/or saved as leads). In this case, the list is initially identified and ranked based on the degree to which the member profiles match the requested characteristics and then re-ranked based on the topic data analyzed from content posted by the associated members. In some example embodiments, the selected one or more member profiles are then transmitted to a requesting member for display.

Figure 2:
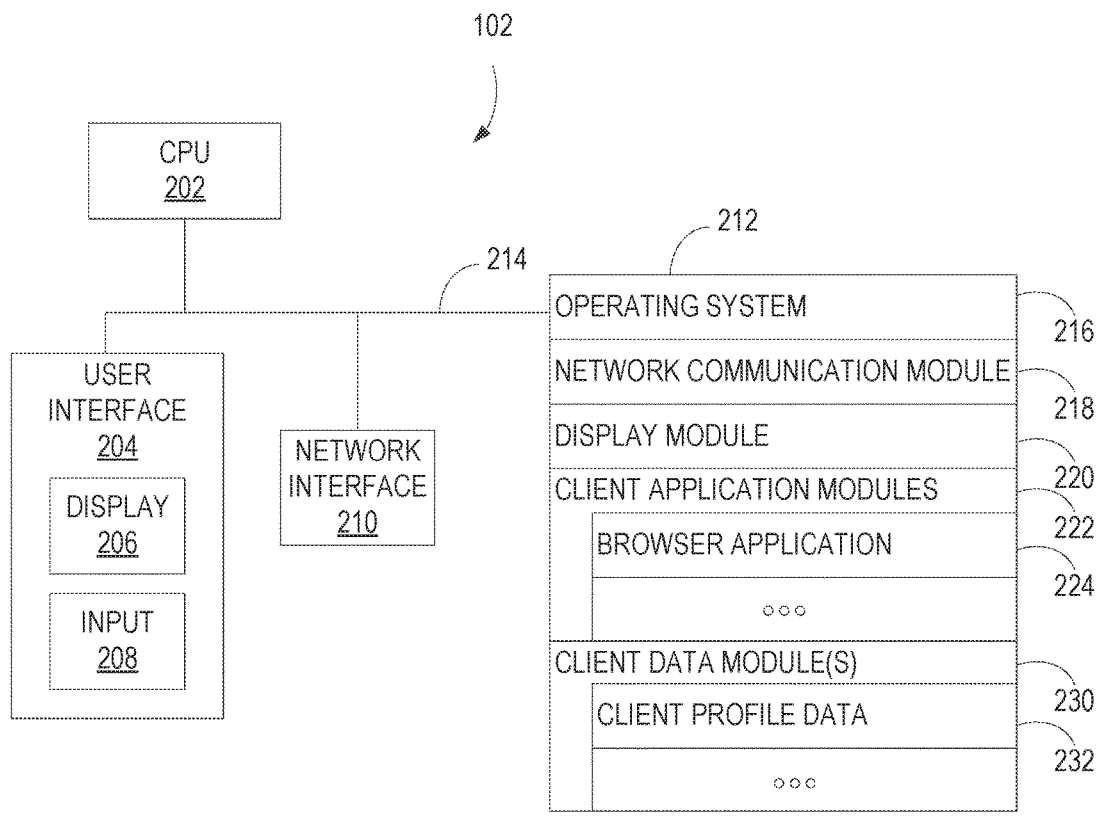
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202; one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:
- an operating system 216 that includes procedures for handling various basic system services and for performing hardware-dependent tasks;
- a network communication module 218 that is used for connecting the client system 102 to other computers via the one or more network interfaces 210 (wired or wireless) and one or more communication networks 110, such as the Internet; other WANs, LANs, metropolitan area networks (MANS), etc.;
- a display module 220 for enabling the information generated by the operating system 216 and client application(s) 104 to be presented visually on the display device 206;
- one or more client applications modules 222 for handling various aspects of interacting with the social networking system (e.g., system 120 in FIG. 1), including but not limited to:
    - a browser application 224 for requesting information from the social networking system 120 (e.g., member profiles) and receiving responses from the social networking system 120; and
- client data module(s) 230 for storing data relevant to clients, including but not limited to:
    - a client profile data 232 for storing profile data related to a member of the social networking system 120 associated with the client system 102.

Figure 3:
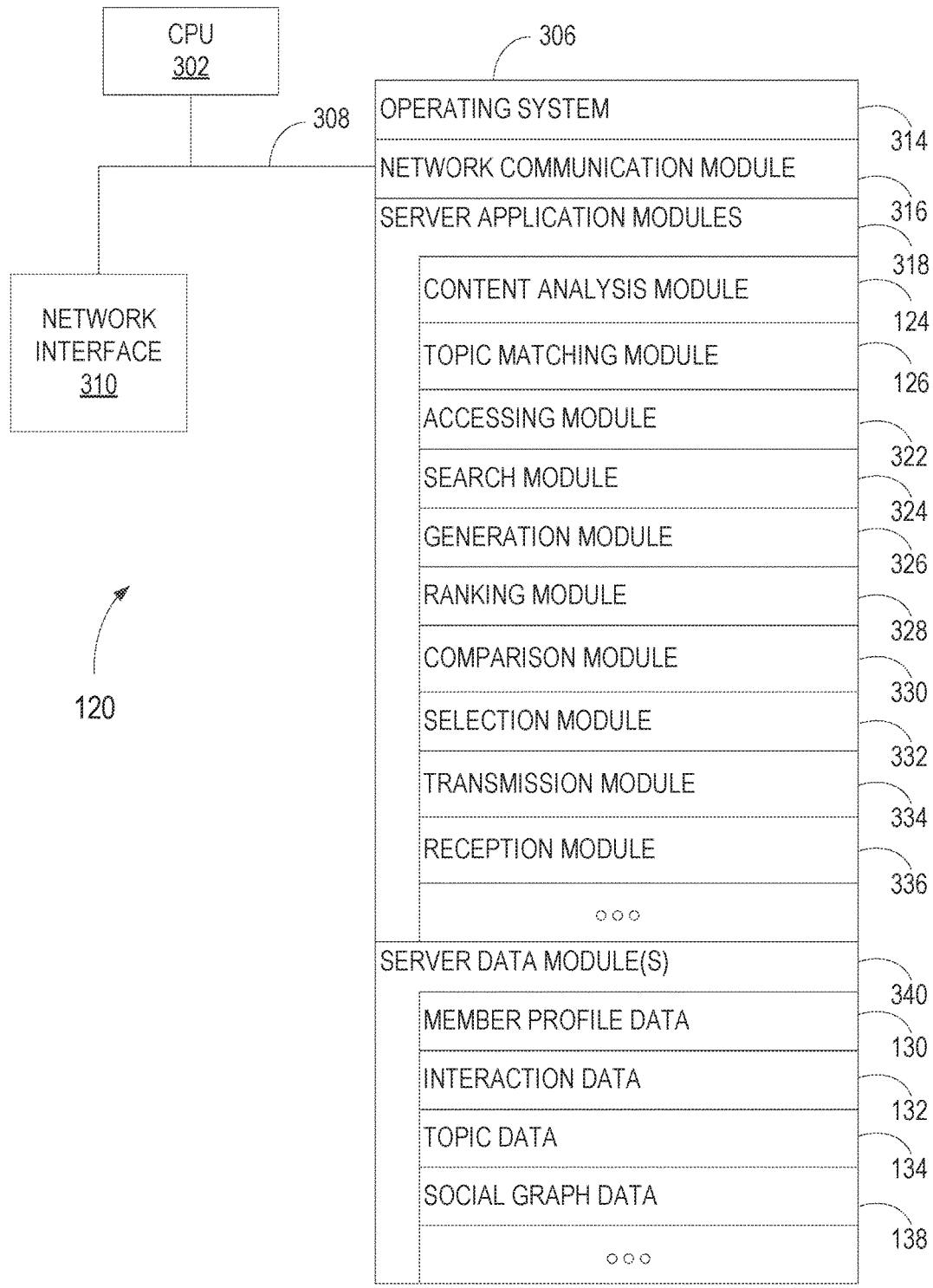
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:
- an operating system 314 that includes procedures for handling various basic system services and for performing hardware-dependent tasks;
- a network communication module 316 that is used for connecting the social networking system 120 to other computers via the one or more network interfaces 310 (wired or wireless) and one or more communication networks 110, such as the Internet, other WANs, LANs, MANS, and so on;
- one or more server application modules 318 for performing the services offered by the social networking system 120, including but not limited to:
    - a content analysis module 124 for identifying content submitted by one or more members of the social networking system 120, including articles, posts, comments, and, in some example embodiments, for identifying lists of embodiments and so on;
    - a topic matching module 126 for determining topics associated with the submitted content (e.g., articles and posts) with particular topics and search queries and terms;
    - an accessing module 322 for accessing member profiles in response to a search request received by the social networking system 120;
    - a search module 324 for identifying member profiles of members that have characteristics that match the characteristics of interest to a member who submitted a search query such as job title, industry, seniority; work history, place in an organization chart and so on;
    - a generation module 326 for generating a similarity score between a submitted query or search word and the topics identified to be associated with the content submitted by a particular member;
    - a ranking module 328 for ranking a list of member profiles based on a determined similarity score between topics of interest to the search member (e.g., a submitted search query) and the topics associated with content the member has submitted;
    - a comparison module 330 for comparing the topics associated with a given content item or group of content items to a search query or term;
    - a selection module 332 for selecting at least one member profile based on a ranking of the member profiles;
    - a transmission module 334 for transmitting a selected member profile to a requesting member' client system (e.g., the client system 102 in FIG. 1); and
    - a reception module 336 for receiving a search request from a client system (e.g., the client system 102 in FIG. 1); and
- server data module(s) 340, holding data related to the social networking system 120, including but not limited to:
    - member profile data 130, including both data provided by the member, who will be prompted to provide some personal information; such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on the member's activity, social graph data 138, overall trend data for the social networking system 20, and so on;

interaction data 132 including data describing each instance in which a member interacts with another member including invitations, connections, messages, profile views, likes, follows, sales, purchases, saving contact information as a lead, and so on;

topic data 134 including information that maps keywords to a topic map, allowing articles, posts, and comments to be correlated with particular topics of interest; and social graph data 138 including data that represents members of the social networking system 120 and the social connections between them.

Figure 4:
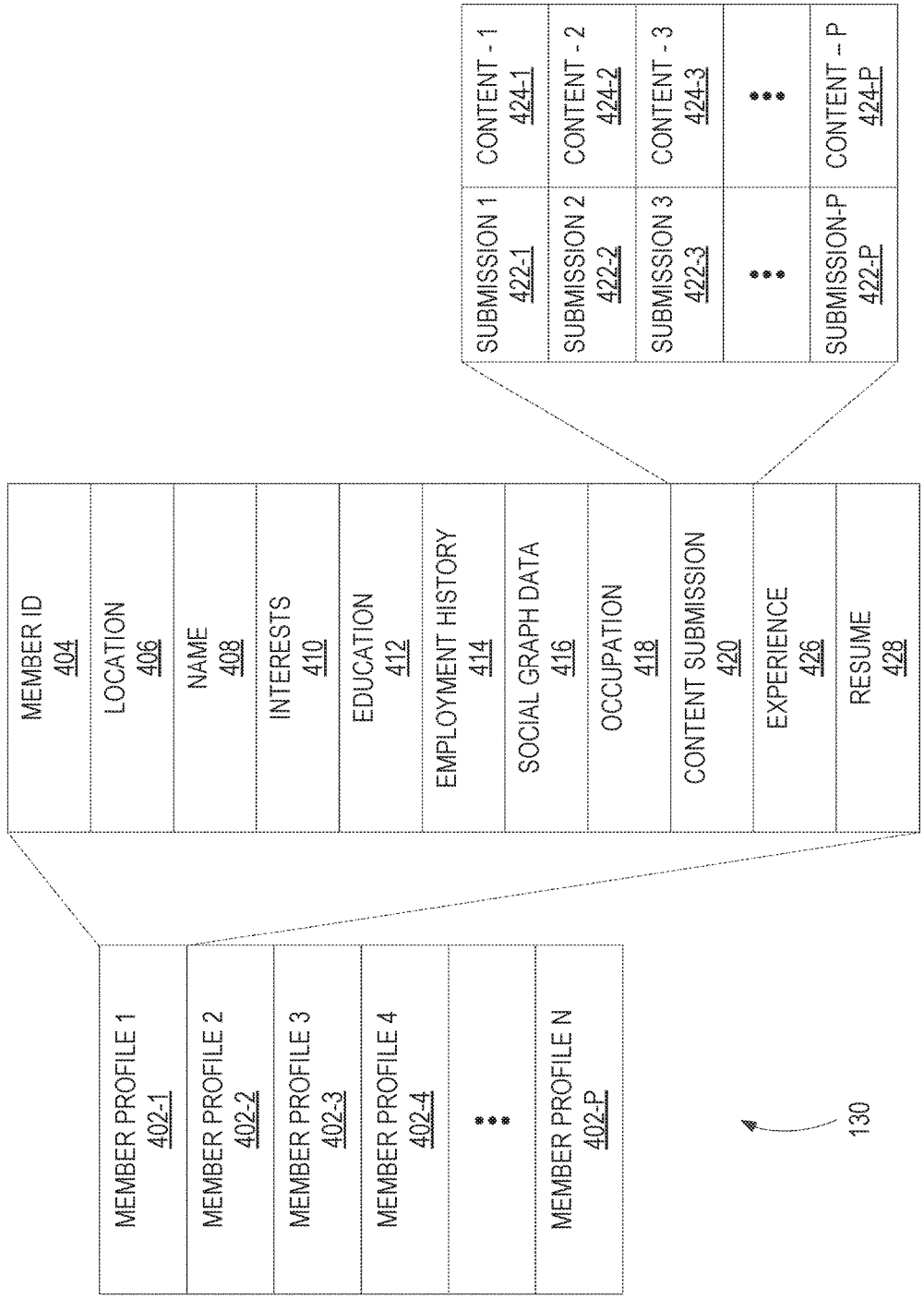
FIG. 4 is a block diagram of an example data structure for storing member profiles, in accordance with some example embodiments.

FIG. 4 is a block diagram of an example data structure for the member profile data 130 for storing member profiles, in accordance with some example embodiments. In accordance with some example embodiments, the member profile data 130 includes a plurality of member profiles 402-1 to 402-P, each of which corresponds to a member of the social networking system 120.

In some example embodiments, a respective member profile 402 stores a unique member ID 404 for the member profile 402, a location 406 associated with the member (e.g., the location that the member indicated was their location), a name 408 for the member (e.g., the member's legal name), member interests 410, member education 412 (e.g., the high school and universities the member attended and the subjects studied, online courses or certifications, licenses, and so on), employment history 414 (e.g., member's past and present work history with job titles), social graph data 416 (e.g., a listing of the member's relationships as tracked by the social networking system 120), occupation 418, content submissions 420, experience 426 (for listing experiences that don't fit under other categories, such as community service or serving on the board of a professional organization), and a resume 428.

In some example embodiments, a member profile 402 includes a list of content submissions 422-1 to 422-P. Each content submission 422 represents an article, post, or comment that the member associated with the member profile 402 has submitted to the social networking system (e.g., the social networking system 120 in FIG. 1). Each content submission 422 has associated content (e.g., the text of an article) 424-1 to 424-P.

Figure 5:
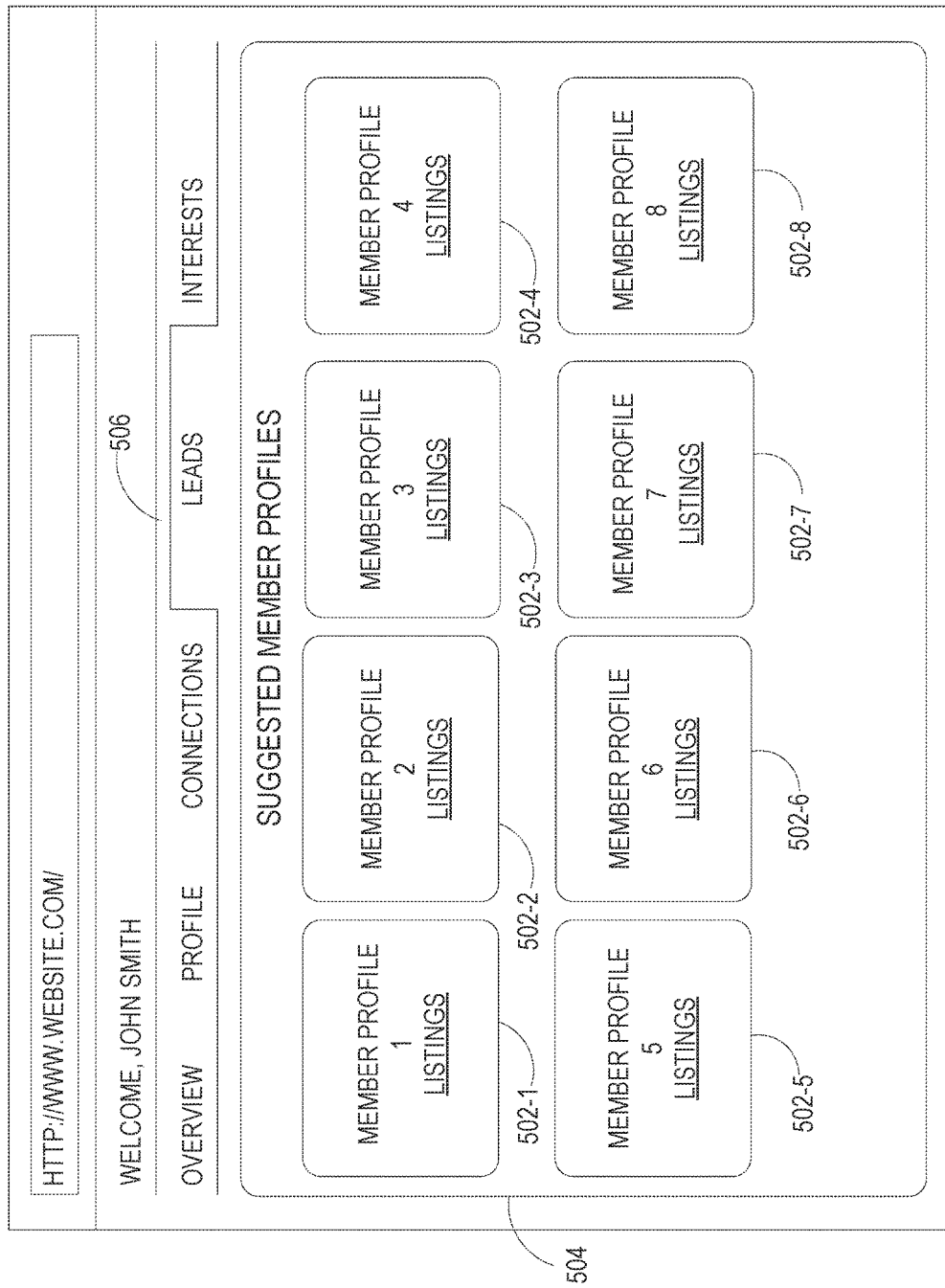
FIG. 5 is a user interface diagram illustrating an example of a user interface or web page that incorporates a list of identified member profiles that match a given set of criteria for a member of a social networking system.

FIG. 5 is a user interface diagram illustrating an example of a user interface 500 or web page that incorporates a list of identified member profiles that match a given set of criteria for a member (John Smith, in this example) of a social networking system (e.g., the social networking system 120 in FIG. 1). In the example user interface 500 of FIG. 5, the displayed user interface 500 represents a web page for a member of the social networking system (e.g., the social networking system 120 in FIG. 1) with the name John Smith.

As can be seen, a leads tab 506 has been selected and a page 504 of relevant member profiles 502 is displayed. The member profiles 502 are determined based on the criteria submitted by the member (or determined based on information in the member profile 502 and past member interactions) and a search query (or other topic information) submitted by the requesting member. Specifically, member profiles 502 are selected based on the degree to which the member profiles 502 match the identified criteria and the degree to which content submitted by the member matches topics of interest to the requesting member. Each member profile 502-1 to 502-8 displays a link to additional information about the member, including information about the member's employer, title, job history, contact information, and so on.

Figure 6:
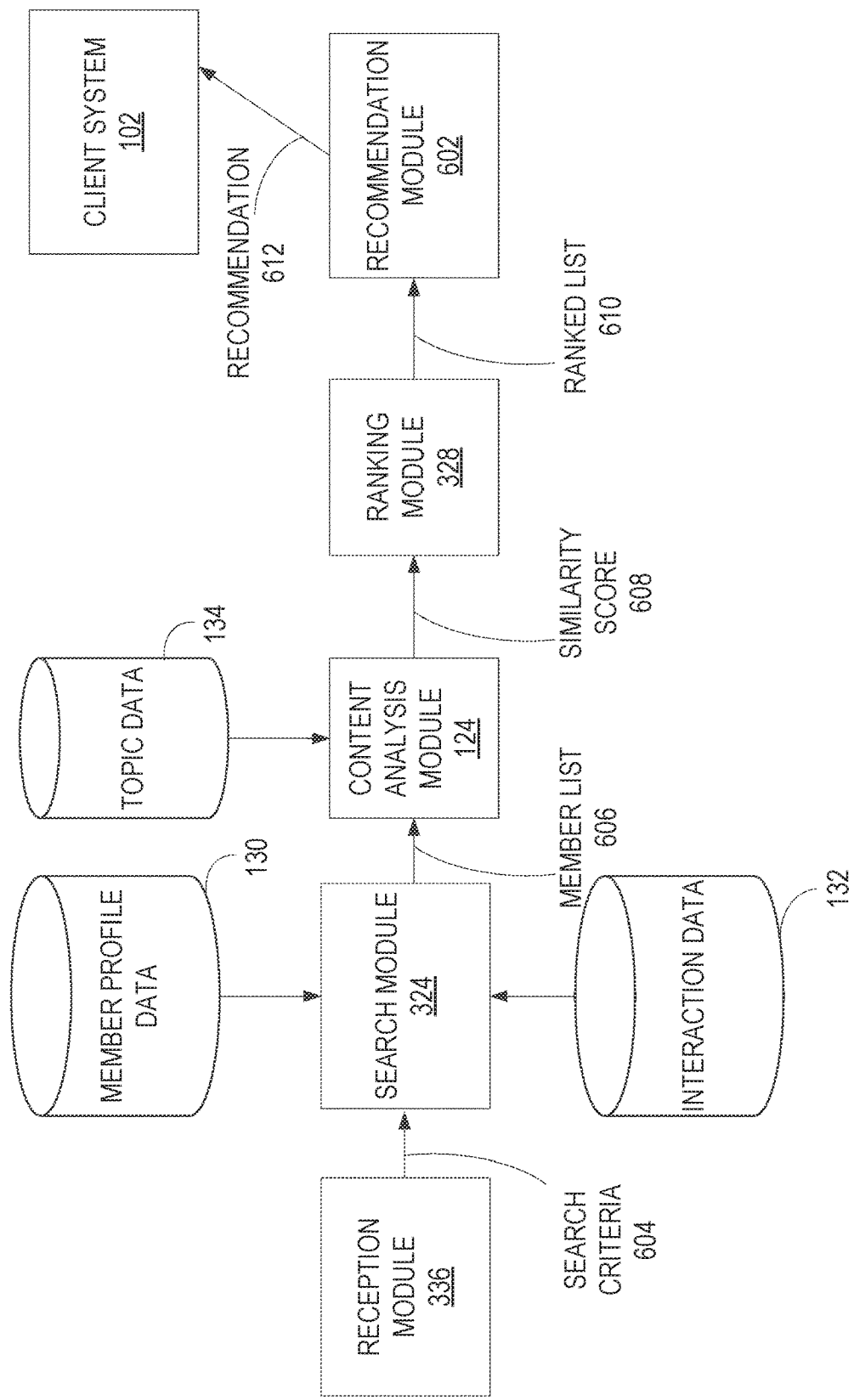
FIG. 6 is a block diagram illustrating a system, in accordance with some example embodiments, for ranking search results based on the posting activity and content submissions of members of a social networking system.

FIG. 6 is a block diagram illustrating a system, in accordance with some example embodiments, for ranking search results based on the posting activity and content submissions of members of a social networking system (e.g., the social networking system 120 in FIG. 1). In some example embodiments, the system is depicted as a functional diagram of modules and data stores.

In some example embodiments, the social networking system (e.g., the social networking system 120 in FIG. 1) receives a recommendation request at a reception module 336. The reception module 336 transmits received search criteria 604 to a search module 324. The transmitted search criteria 604 includes member preference criteria either directly submitted by a requesting member or determined based on an analysis of the requesting member's past member interactions.

In some example embodiments, the search module 324 uses the received search criteria (e.g., search criteria 604) to identify a list (e.g., a member list 606) of member profiles. In some example embodiments, the list of member profiles is based on member characteristics such as age, work history, title, and so on. In some example embodiments, the search module 324 generates the list by accessing member profile data 130 and interaction data 132. In some example embodiments, the generated member list 606 is transmitted to the content analysis module 124.

In some example embodiments, the content analysis module 124 accesses content submission history data for each member in the member list 606. Each submitted content item (e.g., shared articles, posts, and comments) is analyzed. In some example embodiments, the analysis includes identifying a topic (or topics) associated with each content item.

In some example embodiments, the content analysis module 124 first plots each content item (e.g., article) onto a topic map, the topic map being an n-dimensional vector space based on the content information included in the content item. In some example embodiments, this mapping is done using a model created by, a deep learning algorithm.

In some example embodiments, the model is created using a deep learning or neural network learning method. In some example embodiments, the social networking system (e.g., the social networking system 120 in FIG. 1) model uses the entire corpus of content items to create a model for generating vector space representations of each content item.

In another example embodiment, the model is trained to generate appropriate vectors using a neural network supplied with training data. The training data has the input data as will be used in a live example, as well as ground truth data (e.g., data that represents the ideal output from the model). In this example, the neural network takes inputs (e.g., content and metadata about each content item). Each of these inputs is given a weight and passed to a plurality of hidden nodes. The hidden nodes exchange information, also given weights, to produce an output (in this case, one or more factor weights). In some example embodiments, there are several layers of hidden nodes. The model is compared to the ideal output and the weights used by the model are updated until the model produces accurate data. Once the model is trained, the model is tested using a test set of data. The model can then be used to generate the weights used in the decision maker score calculations.

In this example, the content analysis module 124 then groups members based on their position on the topic map. In some example embodiments, the content items are clustered into groups based on content and metadata associated with the content items. Clustering can be accomplished with a wide variety of clustering algorithms. One example algorithm includes k-means clustering. To use k-means clustering for members, each content item is assigned a position on the topic map (based on content). Each content item is assigned to a cluster whose center point is the closest using an equation such as:

$$S_i^{(t)}=\{x_p: \lVert x_p - m_i^{(t)} \rVert^2 \leq \lVert x_p - m_j^{(t)} \rVert^2 \forall j, 1 \leq j \leq k\}$$

where each member (x) is assigned to one cluster S at time t, based on which center point (m with coordinates i, j) is closest to the position of the content item in the space.

Once content items have been assigned to clusters, the central points of the clusters are updated with a formula such as:

$$m_i^{t+1} = \frac{1}{S_i^{(t)}} \sum_{x_j \in S_i^{(t)}} x_j$$

Once new central points are determined, the content items are clustered again. Once the content items stop shifting between clusters, the clusters are determined to have settled.

In this way, content items can be grouped into a plurality of groups based on the topics associated with each content item. Thus, once a particular article is grouped, one or more topics can be associated with each group and thus with the particular article. In some example embodiments, the member profiles in the member list 606 can then be scored by the degree to which the content items submitted by a given member match topics in which the searching member is interested (e.g., based on a search query submitted by the searching member or the member's profile data).

In some example embodiments, each member is assigned a similarity score 608 for each member profile based on the analysis of the content included in content items submitted by the member. For example, the similarity score 608 can be generated by determining that the percentage of content items match at least one topic that the searching member is interested in.

In some example embodiments, the similarity scores 608 for each member profile in the member list 606 are transmitted to the ranking module 328. In some example embodiments, the ranking module 328 reranks the list of similarity scores 608.

In some example embodiments, a ranked list 610 of member profiles is transmitted to the recommendation module 602. The recommendation module 602 selects a number of member profiles based on the ranking, and transmits a recommendation 612 to the client system (e.g., the client system 102 in FIG. 1).

Figure 7:
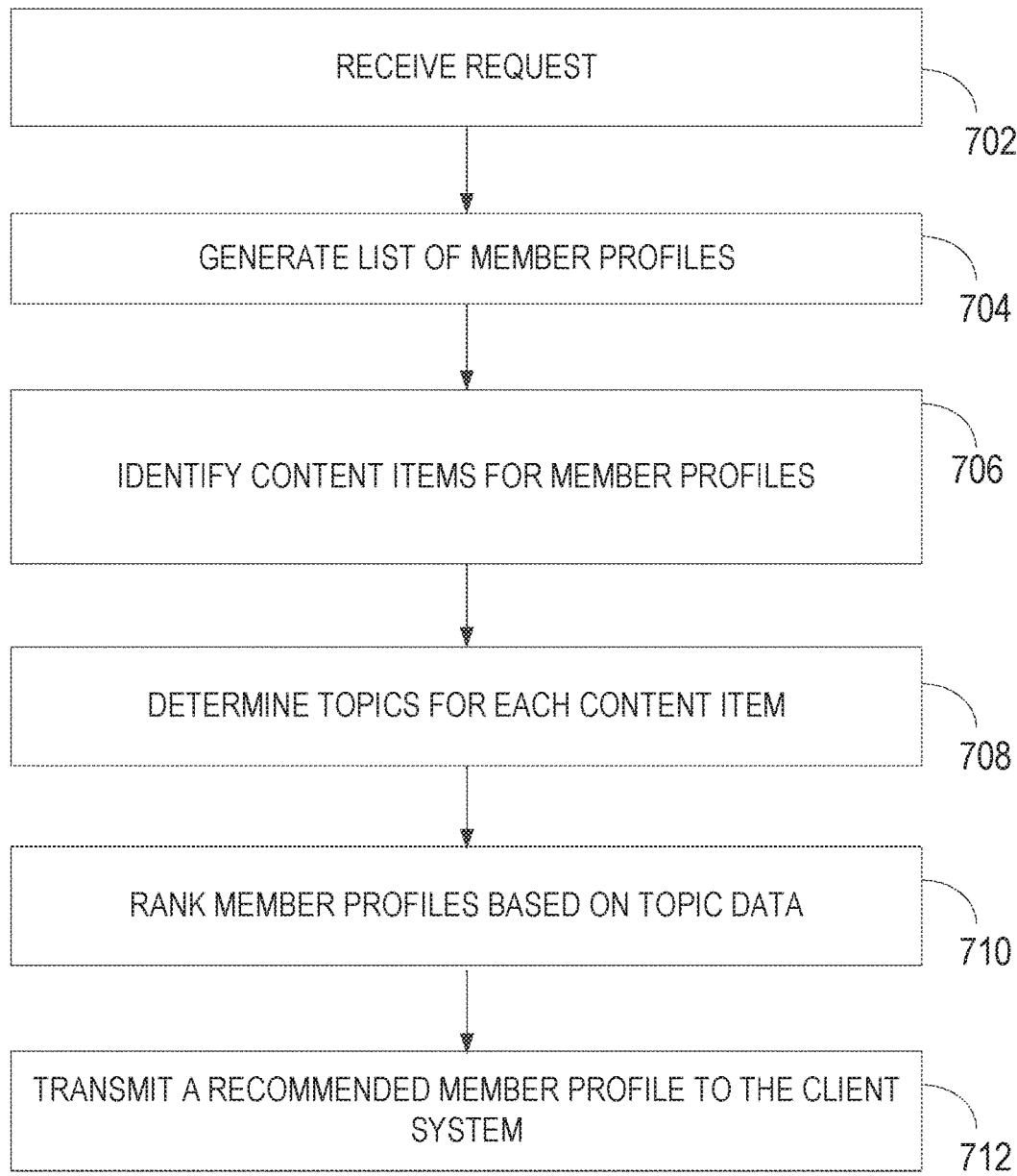
FIG. 7 is a flow diagram illustrating a method, in accordance with some example embodiments, for ranking search results based on members' posting activity and content.

FIG. 7 is a flow diagram illustrating a method, in accordance with some example embodiments, for ranking search results based on members' posting activity and content. Each of the operations shown in FIG. 7 may correspond to instructions stored in a computer memory or computer-readable storage medium. Optional operations are indicated by dashed lines (e.g., boxes with dashed-line borders). In some embodiments, the method described in FIG. 7 is performed by the social networking system (e.g., system 120 in FIG. 120). However, the method described can also be performed by any other suitable configuration of electronic hardware.

In some embodiments, the method is performed by a social networking system (e.g., system 120 in FIG. 120) including one or more processors and memory storing one or more programs for execution by the one or more processors.

In some example embodiments, the social networking system (e.g., system 120 in FIG. 120) receives (702) a request to identify at least one member profile from a client system (e.g., client system 102 in FIG. 1). In some example embodiments the request to identify member profiles specifies particular characteristics of interest to the requesting member. In some example embodiments the search is part of a customer management system integrated with or into the social networking system (e.g., the system 120 in FIG. 1) and the search is a request to identify one or more member profiles as sales leads.

In response to receiving a request for at least one member profile, the social networking system e.g., the system 120 in FIG. 1) generates (704) a list of members (e.g., the member list 606 of FIG. 6) who meet member profile criteria (e.g., either specific attributes (or attribute ranges) submitted by the member or determined based on an past member behavior).

In some example embodiments, the social networking system (e.g., the social networking system 120 in FIG. 1) identifies (706) content items associated with member profiles in the list of member profiles. For example, the social networking system (e.g., the social networking system 120 in FIG. 1) accesses content submissions associated with each member profile in the list of member profiles including shared articles, posts, comments, and other content types.

In some example embodiments, the social networking system (e.g., the social networking system 120 in FIG. 1) determines (708) at least one topic associated with each submitted content item. As noted above, determining topics associated with each content item can be accomplished by analyzing the keywords in each content item and using a lookup table to identify associated topics. In other example embodiments, a model can be designed that uses the text of the content item and additional information about the content item (e.g., who submitted the content item, responses to the content item, time of the content item, and so on).

In some example embodiments, the social networking system (e.g., the social networking system 120 in FIG. 1) uses the determined topics to rank (710) each member profile in the list of member profiles. In some example embodiments, the requesting client transmits a topic of interest with the search request. Thus, ranking member profiles can include the percentage of content items that are associated with the submitted topic of interest. In other example embodiments, the ranking includes determining the total number of content items that are associated with the topic of interest. For example, the social networking system (e.g., the social networking system 120 in FIG. 1) determines, for each member profile, the quality, of submitted content items associated with the submitted topic. In some example embodiments, quality is determined based on member reactions (e.g., ratio of up-votes to down-votes, total number of likes, total number of comments, and so on).

In some example embodiments, the social networking system (e.g., the social networking system 120 in FIG. 1) selects at least one member profile from the list of member profiles based on the rankings and the number of member profile recommendations that are requested (e.g., based on the space available to display the recommendations). The social networking system (e.g., the social networking system 120 in FIG. 1) then transmits (712) the selected member profiles to the client system (e.g., the client system 102 in FIG. 1) as recommendations.

Figure 8A:
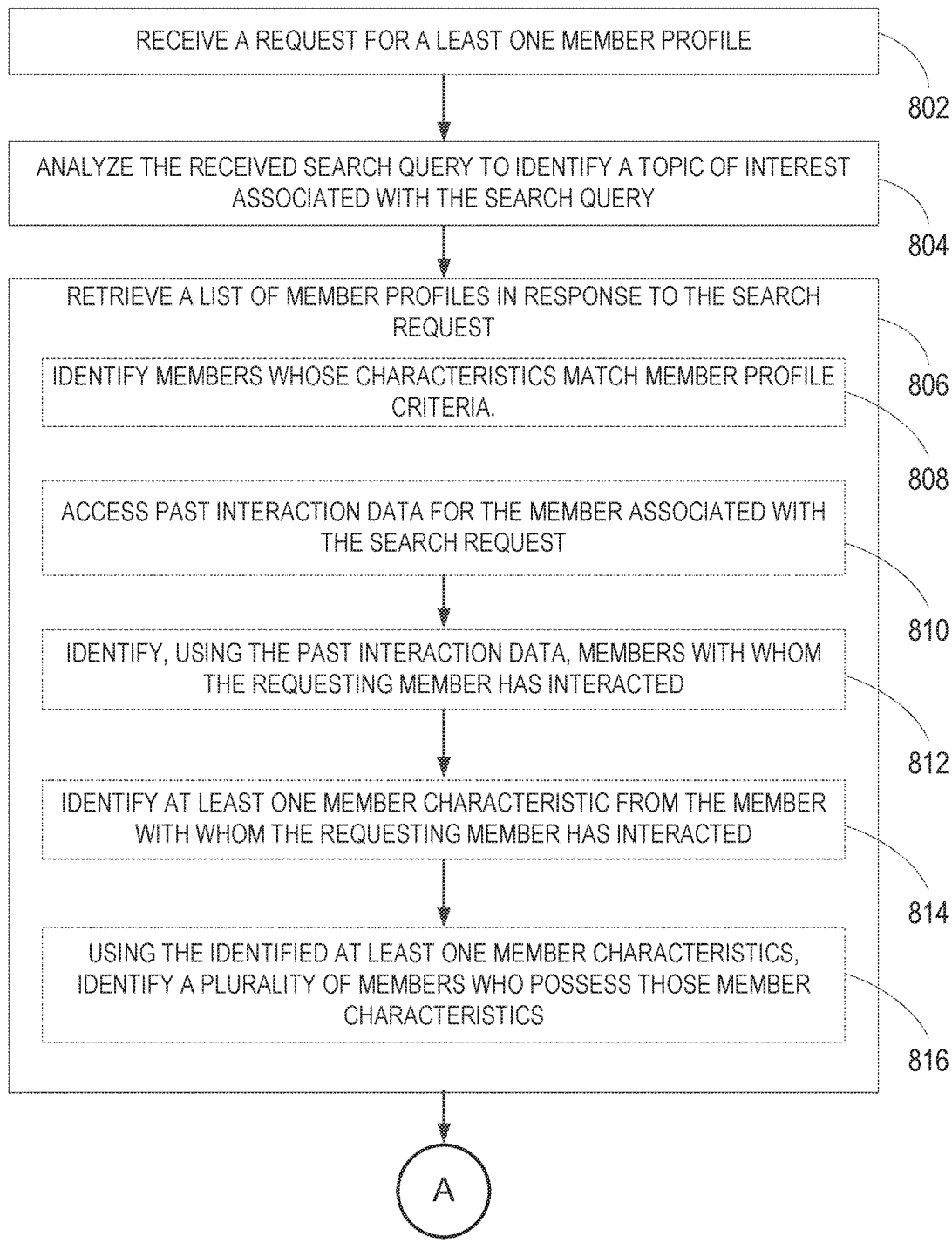
FIGS. 8A-8C are flow diagrams illustrating a method, in accordance with some example embodiments, for ranking search results based on members' posting activity and content.

FIG. 8A is a flow diagram illustrating a method, in accordance with some example embodiments, for ranking search results based on members' posting activity and content. Each of the operations shown in FIG. 8A may correspond to instructions stored in a computer memory or computer-readable storage medium. Optional operations are indicated by dashed lines (e.g., boxes with dashed-line borders). In some embodiments, the method described in FIG. 8A is performed by the social networking system (e.g., system 120 in FIG. 120). However, the method described can also be performed by any other suitable configuration of electronic hardware.

In some embodiments, the method is performed by a social networking system (e.g., system 120 in FIG. 120) including one or more processors and memory storing one or more programs for execution by the one or more processors.

In some example embodiments, the social networking system (e.g., the social networking system 120 in FIG. 1) receives (802) a search request for at least one member profile. In some example embodiments, the search request includes member profile criteria including, but not limited to, a member's age, seniority, years of employment, past purchase, decision maker score, title, work history, social contacts and so on.

In some example embodiments, the search request includes a topic of interest. For example, a requesting member sends a search request to the social networking system (e.g., the social networking system 120 in FIG. 1) and includes a list of member characteristic criteria and a topic of interest.

In other example embodiments, the search request includes a search query and the social networking system (e.g., the social networking system 120 in FIG. 1) analyzes (804) the received search query to identify a topic of interest associated with the search query. In some example embodiments, the social networking system (e.g., the social networking system 120 in FIG. 1) uses a lookup table to associate search queries with particular topics. In other example embodiments, a Bayesian classifier can be used to associate a particular search query (or entire search request) with a particular topic.

In some example embodiments, the social networking system (e.g., the social networking system 120 in FIG. 1) retrieves (806) a list of member profiles in response to the search request. In some example embodiments, the social networking system (e.g., the social networking system 120 in FIG. 1) identifies (808) members whose characteristics match the member profile criteria. Thus, if the criteria require a member with eight or more years working in procurement in an internet provider company, the social networking system (e.g., the social networking system 120 in FIG. 1) will return a list of member profiles for members who meet those criteria.

In some example embodiments, the social networking system (e.g., the social networking system 120 in FIG. 1) accesses (810) past interaction data for the member associated with the search request. For example, the social networking system (e.g., the social networking system 120 in FIG. 1) identifies the past sales the requesting member has made using customer relationship management capability associated with the social networking system (e.g., the social networking system 120 in FIG. 1). In some example embodiments, the social networking system (e.g., the social networking system 120 in FIG. 1) identifies (812), using the past interaction data, members with whom the requesting member has interacted. Continuing the above example, the social networking system (e.g., the social networking system 120 in FIG. 1) identifies members with whom the requesting member has had a sales transaction.

In some example embodiments, the social networking system (e.g., the social networking system 120 in FIG. 1) identifies (814) at least one member characteristic from the member with whom the requesting member has interacted. Thus, the social networking system (e.g., the social networking system 120 in FIG. 1) can, using the list of members with whom the requesting member has previously interacted, identify one or more common characteristics.

Using the identified at least one member characteristics, social networking system (e.g., the social networking system 120 in FIG. 1) identifies (816) a plurality of members who possess those member characteristics.

Figure 8B:
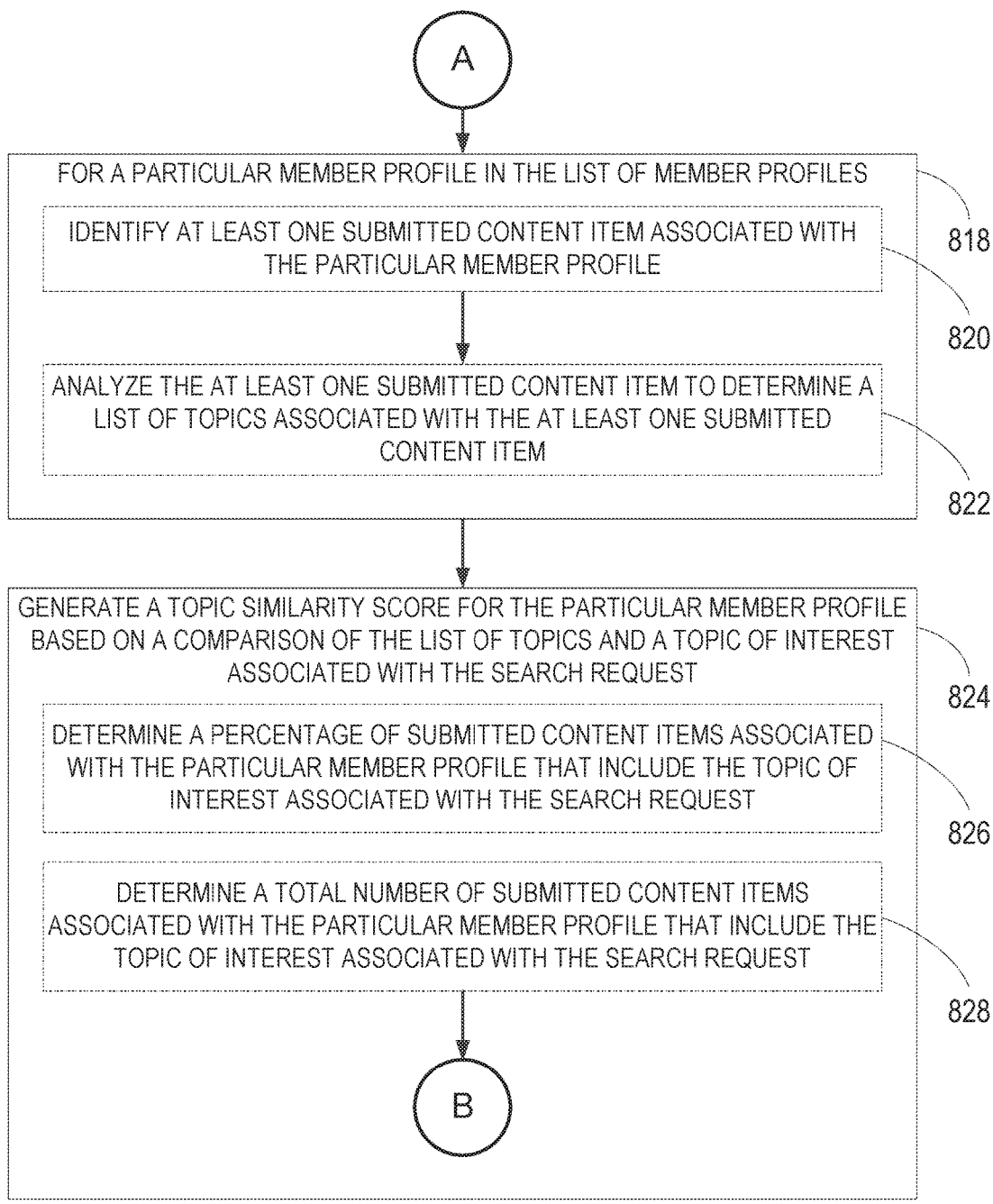

FIG. 8B is a flow diagram illustrating a method, in accordance with some example embodiments, for ranking search results based on members' posting activity and content. Each of the operations shown in FIG. 8B may correspond to instructions stored in a computer memory or computer-readable storage medium. Optional operations are indicated by dashed lines (e.g., boxes with dashed-line borders). In some embodiments, the method described in FIG. 8B is performed by the social networking system (e.g., system 120 in FIG. 120). However, the method described can also be performed by any other suitable configuration of electronic hardware. FIG. 8B continues the method of FIG. 8A.

In some embodiments, the method is performed by a social networking system (e.g., system 120 in FIG. 120) including one or more processors and memory storing one or more programs for execution by the one or more processors.

For a particular member profile in the list of member profiles (818), the social networking system (e.g., the social networking system 120 in FIG. 1) identifies (820) at least one submitted content item associated with the particular member profile. For example, a member profile includes a list of content submissions (e.g., 420 in FIG. 4).

In some example embodiments, the social networking system (e.g., the social networking system 120 in FIG. 1) analyzes (822) the at least one submitted content item to determine a list of topics associated with the at least one submitted content item. As noted above, this determination can be made using a variety of methods. For example, keywords can be determined for a given content item and used in a lookup table. In other example embodiments, information about each submitted content item can be used as input in to a model that then determines at least one topic.

In some example embodiments, analyzing the at least one submitted content item to determine a list of topics associated with the at least one submitted content item includes the social networking system (e.g., the social networking system 120 in FIG. 1) identifying one or more keywords in the submitted content item. The social networking system (e.g., the social networking system 120 in FIG. 1) then matches the identified one or more keywords to at least one associated topic. In some example embodiments, the social networking system (e.g., the social networking system 120 in FIG. 1) uses an inverted index to identify keywords within the content item.

In some example embodiments, the social networking system (e.g., the social networking system 120 in FIG. 1) generates (824) a topic similarity score for the particular member profile based on a comparison of the list of topics and a topic of interest associated with the search request. In some example embodiments, the social networking system (e.g., the social networking system 120 in FIG. 1) determines (826) a percentage of submitted content items associated with the particular member profile that include the topic of interest associated with the search request.

In other example embodiments, the social networking system (e.g., the social networking system 120 in FIG. 1) determines (828) a total number of submitted content items associated with the particular member profile that include the topic of interest associated with the search request.

Figure 8C:
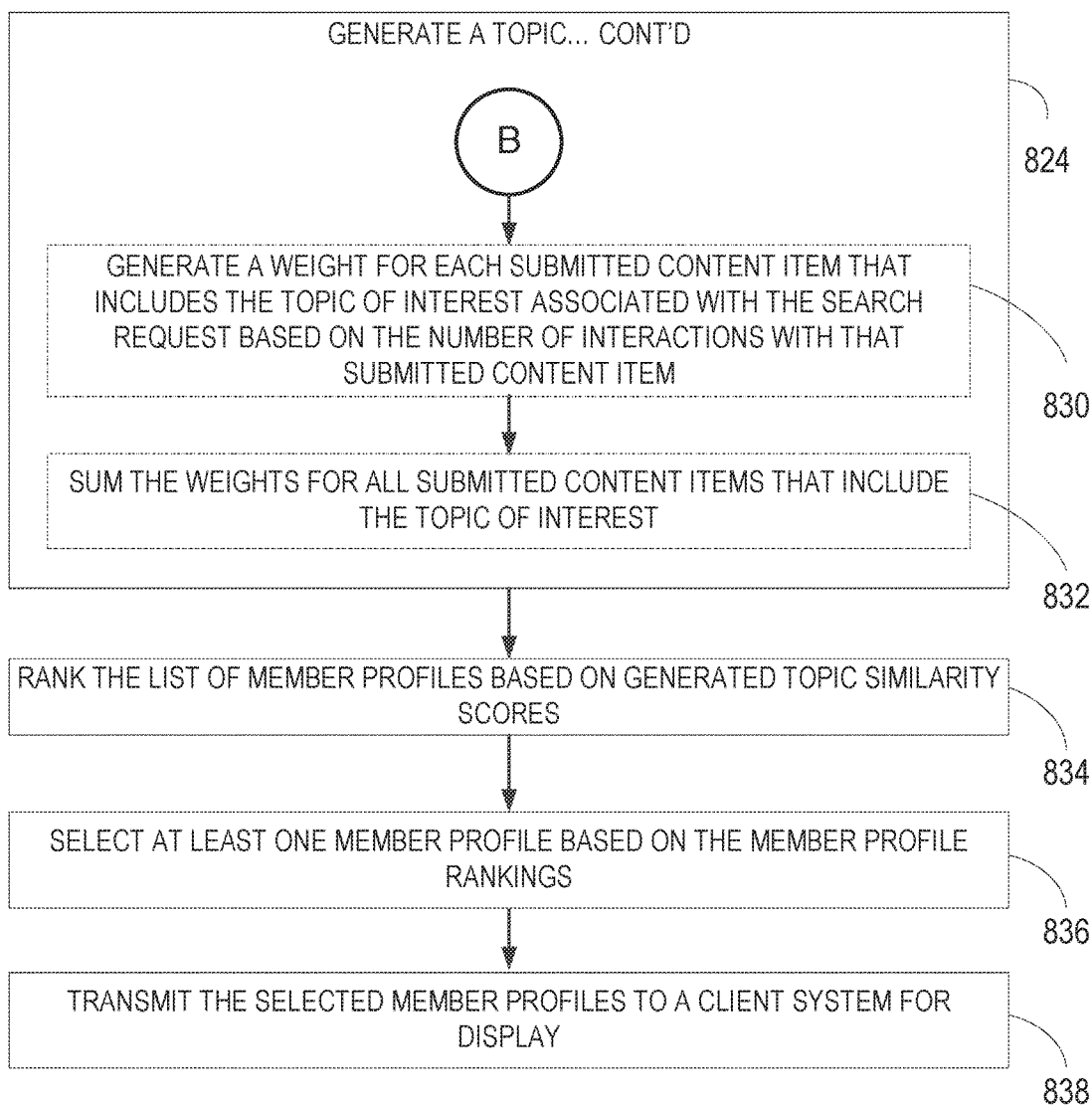

FIG. 8C is a flow diagram illustrating a method, in accordance with some example embodiments, for ranking search results based on members' posting activity and content. Each of the operations shown in FIG. 8C may correspond to instructions stored in a computer memory or computer-readable storage medium. Optional operations are indicated by dashed lines (e.g., boxes with dashed-line borders). In some embodiments, the method described in FIG. 8C is performed by the social networking system (e.g., system 120 in FIG. 120). However, the method described can also be performed by any other suitable configuration of electronic hardware. FIG. 8C continues the method of FIGS. 8A and 8B.

In some embodiments, the method is performed by a social networking system (e.g., system 120 in FIG. 120) including one or more processors and memory storing one or more programs for execution by the one or more processors.

In some example embodiments, the social networking system (e.g., the social networking system 120 in FIG. 1) generates (830) a weight for each submitted content item that includes the topic of interest associated with the search request based on the number of interactions with that submitted content item. In some example embodiments, the member interactions include likes, comments, and up votes. In other example embodiments, the social networking system (e.g., the social networking system 120 in FIG. 1) can also factor in the influence of the members who make the interactions. For example, a like from a member with a high influence is weighted more than a like from a member with low influence.

In some example embodiments, the social networking system (e.g., the social networking system 120 in FIG. 1) sums (832) the weights for submitted content items that include the topic of interest. For example, if four content items are identified as having a matching topic of interest, each content item can be given a particular weight and used in a formula as follows:

$$SS=c1*w1+c2*w2+c3*w3+c4*w4$$

In this example, each content item has an associated weight (e.g., a value between 0 to 1 such that the weights add up to 1). In the above example, content item 1 (c1) is associated with w1 and so on.

In some example embodiments, the social networking system (e.g., the social networking system 120 in FIG. 1) ranks (834) the list of member profiles based on generated topic similarity scores. Thus, the list of member profiles is ordered based on their respective similarity scores. In some example embodiments, the social networking system (e.g., the social networking system 120 in FIG. 1) selects (836) at least one member profile based on the member profile rankings. In some example embodiments, the social networking system (e.g., the social networking system 120 in FIG. 1) transmits (838) the selected member profiles to a client system for display.

Software Architecture

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

Figure 9:
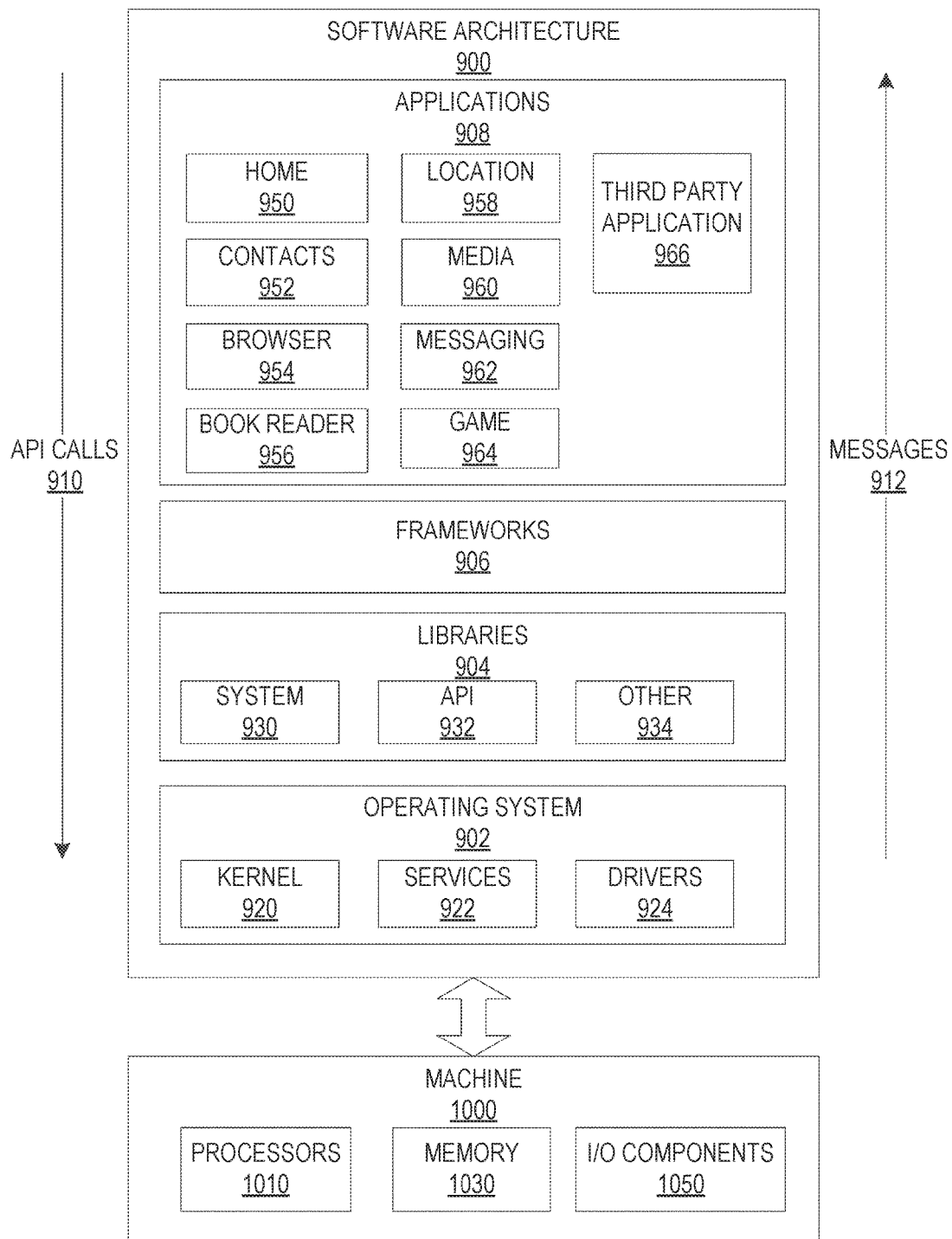
FIG. 9 is a block diagram illustrating an architecture of software, which may be installed on any of one or more devices, in accordance with some example embodiments.

FIG. 9 is a block diagram illustrating an architecture of software 900, which may be installed on any one or more of the devices of FIG. 1. FIG. 9 is merely a non-limiting example of an architecture of software 900 and it will be appreciated that many other architectures may be implemented to facilitate the functionality described herein. The software 900 may be executing on hardware such as a machine 1000 of FIG. 10 that includes processors 1010, memory 1030, and I/O components 1050. In the example architecture of FIG. 9, the software 900 may be conceptualized as a stack of layers where each layer may provide particular functionality. For example, the software 900 may include layers such as an operating system 902, libraries 904, frameworks 906, and applications 908. Operationally, the applications 908 may invoke API calls 910 through the software stack and receive messages 912 in response to the API calls 910.

The operating system 902 may manage hardware resources and provide common services. The operating system 902 may include, for example, a kernel 920, services 922, and drivers 924. The kernel 920 may act as an abstraction layer between the hardware and the other software layers. For example, the kernel 920 may be responsible for memory management, processor management (e.g., scheduling), component management, networking, security settings, and so on. The services 922 may provide other common services for the other software layers. The drivers 924 may be responsible for controlling and/or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 904 may provide a low-level common infrastructure that may be utilized by the applications 908. The libraries 904 may include system libraries 930 (e.g., C standard library) that may provide functions such as memory allocation functions, string manipulation functions, mathematic functions, and the like. In addition, the libraries 904 may include API libraries 932 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 904 may also include a wide variety of other libraries 934 to provide many other APIs to the applications 908.

The frameworks 906 may provide a high-level common infrastructure that may be utilized by the applications 908, For example, the frameworks 906 may provide various graphical user interface (GUI) functions, high-level resource management, high-level location services, and so forth. The frameworks 906 may provide a broad spectrum of other APIs that may be utilized by the applications 908, some of which may be specific to a particular operating system 902 or platform.

The applications 908 include a home application 950, a contacts application 952, a browser application 954, a book reader application 956, a location application 958, a media application 960, a messaging application 962, a game application 964, and a broad assortment of other applications, such as a third-party application 966. In a specific example, the third-party application 966 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third-party application 966 may invoke the API calls 910 provided by the mobile operating system, such as the operating system 902, to facilitate functionality described herein.

Example Machine Architecture and Machine-Readable Medium

Figure 10:
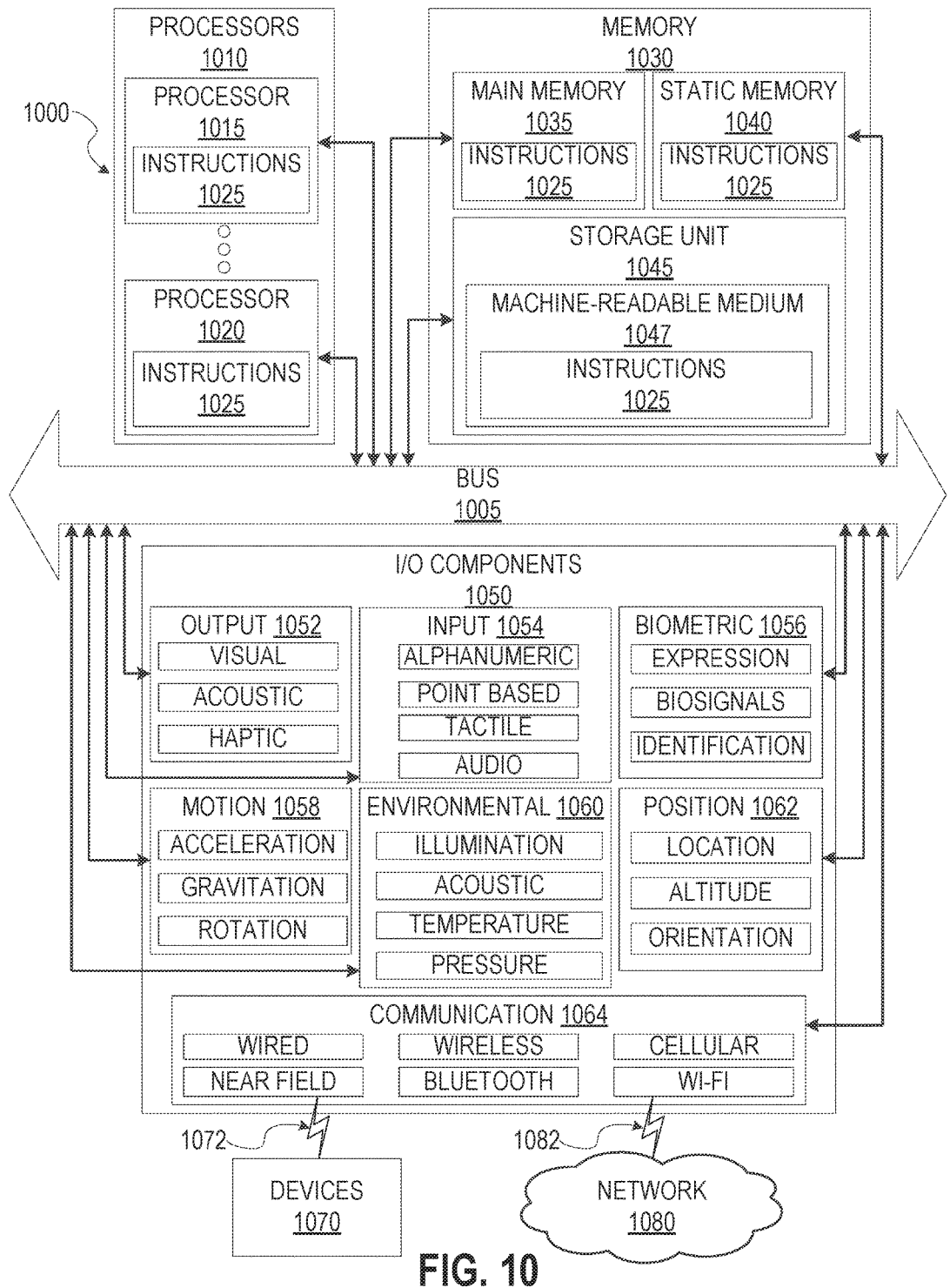
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1025 (e.g., software 900, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but be not limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device a smart appliance), other smart devices, a web appliance, a network router, a network switch, a network bridge, or any machine capable of executing the instructions 1025, sequentially or otherwise, that specify actions to be taken by the machine 1000. Further, while only a single machine 1000 is illustrated, the term "machine" shall also be taken to include a collection of machines 1000 that individually or jointly execute the instructions 1025 to perform any one or more of the methodologies discussed herein.

The machine 1000 may include processors 1010, memory 1030, and I/O components 1050, which may be configured to communicate with each other via a bus 1005. In an example embodiment, the processors 1010 (e.g., a CPU, a reduced instruction set computing (RISC) processor, a complex instruction set computing (CISC) processor, a graphics processing unit (GPU), a digital signal processor (DSP), an application specific integrated circuit (AMC), a radio-frequency integrated circuit (RFIC), another processor, or any suitable combination thereof) may include, for example, a processor 1015 and a processor 1020, which may execute the instructions 1025. The term "processor" is intended to include multi-core processors 1010 that may comprise two or more independent processors 1015, 1020 (also referred to as "cores") that may execute the instructions 1025 contemporaneously. Although FIG. 10 shows multiple processors 1010, the machine 1000 may include a single processor 1010 with a single core, a single processor 1010 with multiple cores (e.g., a multi-core processor), multiple processors 1010 with a single core, multiple processors 1010 with multiple cores, or any combination thereof.

The memory 1030 may include a main memory 1035, a static memory 1040, and a storage unit 1045 accessible to the processors 1010 via the bus 1005. The storage unit 1045 may include a machine-readable medium 1047 on which are stored the instructions 1025, embodying any one or more of the methodologies or functions described herein. The instructions 1025 may also reside, completely or at least partially, within the main memory 1035, within the static memory 1040, within at least one of the processors 1010 (e.g., within the processor's cache memory), or any suitable combination thereof, during execution thereof by the machine 1000. Accordingly, the main memory 1035, the static memory 1040, and the processors 1010 may be considered machine-readable media 1047.

As used herein, the term "memory" refers to a machine-readable medium 1047 able to store data temporarily or permanently and may be taken to include, but not be limited to, random-access memory (RAM), read-only memory (ROM), buffer memory, flash memory, and cache memory. While the machine-readable medium 1047 is shown, in an example embodiment, to be a single medium, the term "machine-readable medium" should be taken to include a single medium or multiple media (e.g., a centralized or distributed database, or associated caches and servers) able to store the instructions 1025. The term "machine-readable medium" shall also be taken to include any medium, or combination of multiple media; that is capable of storing instructions (e.g., instructions 1025) for execution by a machine (e.g., machine 1000), such that the instructions 1025, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 may include a wide variety of components to receive input, provide and/or produce output, transmit information, exchange information, capture measurements, and so on. It will be appreciated that the I/O components 1050 may include many other components that are not shown in FIG. 10. In various example embodiments, the I/O components 1050 may include output components 1052 and/or input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 may include alphanumeric input components (e.g., a keyboard, a touch screen configured to receive alphanumeric input, a photo-optical keyboard, or other alphanumeric input components); point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 1050 may include biometric components 1056, motion components 1058, environmental components 1060, and/or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 1058 may include acceleration sensor components e.g., accelerometer), gravitation sensor components, rotation sensor components (e.g., gyroscope), and so forth. The environmental components 1060 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 1062 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 and/or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine 1000 and/or any of a wide variety of peripheral devices a peripheral device coupled via a USB).

Moreover, the communication components 1064 may detect identifiers and/or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra. Code, UCC RSS-2D bar code, and other optical codes), acoustic detection components (e.g., microphones to identify tagged audio signals), and so on. In addition, a variety of information may be derived via the communication components 1064, such as location via Internet Protocol (IP) geolocation, location via Wi-Fi® signal triangulation, location via detecting an NEC beacon signal that may indicate a particular location, and so forth.

Transmission Medium

In various example embodiments, one or more portions of the network 1080 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1025 may be transmitted and/or received over the network 1080 using a transmission medium via a network interface device (e.g., a network interface component included in the communication components 1064) and utilizing any one of a number of well-known transfer protocols (e.g., HTTP). Similarly, the instructions 1025 may be transmitted and/or received using a transmission medium via the coupling 1072 (e.g., a peer-to-peer coupling) to the devices 1070. The term "transmission medium" shall be taken to include any intangible medium that is capable of storing, encoding, or carrying the instructions 1025 for execution by the machine 1000, and includes digital or analog communications signals or other intangible media to facilitate communication of such software 900.

Furthermore, the machine-readable medium 1047 is non-transitory (in other words, not having any transitory signals) in that it does not embody a propagating signal. However, labeling the machine-readable medium 1047 as "non-transitory" should not be construed to mean that the medium is incapable of movement; the medium should be considered as being transportable from one physical location to another. Additionally, since the machine-readable medium 1047 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A computer-implemented method performed at a social networking system, using at least one computer processor, the method comprising:
   receiving a search request for at least one member profile;
   retrieving a list of member profiles in response to the search request;
   for a particular member profile in the list of member profiles:
   identifying at least one submitted content item associated with a member of the social networking system and associated with the particular member profile;
   analyzing the at least one submitted content item to determine a list of topics associated with the at least one submitted content item;
   generating a topic similarity score for the particular member profile based on a comparison of the list of topics and a topic of interest associated with the search request, wherein generating a topic similarity score for the particular member profile based on a comparison of the list of topics and a topic of interest associated with the search request includes determining a percentage of submitted content items associated with the particular member profile that include the topic of interest associated with the search request;
   ranking the list of member profiles based on generated topic similarity scores;
   selecting at least one member profile based on the member profile rankings; and
   transmitting the selected at least one member profile to a client system for display.

2. The method of claim 1, wherein the search request includes member profile criteria and retrieving a list of member profiles includes identifying members whose characteristics match the member profile criteria.

3. The method of claim 1, wherein the search request includes the topic of interest.

4. The method of claim 1, wherein the search request includes a search query.

5. The method of claim 4, further comprising:
analyzing the received search query to identify a topic of interest associated with the search query.

6. The method of claim 1, wherein retrieving a list of member profiles in response to the search request further comprises:
accessing past interaction data for the member associated with the search request;
identifying, using the past interaction data, members with whom the requesting member has interacted;
identifying at least one member characteristics from the member with whom the requesting member has interacted; and
using the identified at least one member characteristics, identifying a plurality of members who possess those member characteristics.

7. The method of claim 6, wherein the past interaction data include sales.

8. The method of claim 1, wherein analyzing the at least one submitted content item to determine a list of topics associated with the at least one submitted content item further comprises:
identifying one or more keywords in the submitted content item; and
matching the identified one or more keywords to at least one associated topic.

9. The method of claim 8, wherein identifying one or more keywords in the submitted content item includes:
using inverse frequency analysis to identify keywords within the content item.

10. The method of claim 1, wherein generating a topic similarity score for the particular member profile based on a comparison of the list of topics and a topic of interest associated with the search request includes:
generating a weight for each submitted content item that includes the topic of interest associated with the search request based on the number of member interactions with that submitted content item; and
summing the weights for submitted content items that include the topic of interest.

11. The method of claim 10, wherein the member interactions include likes, comments, and up votes.

12. A system comprising:
a computer-readable memory storing computer-executable instructions that, when executed by one or more hardware processors, configure the system to perform a plurality of operations, the operations comprising:
receiving a search request for at least one member profile;
retrieving a list of member profiles in response to the search request;
for a particular member profile in the list of member profiles:
identifying at least one submitted content item associated with the particular member profile;
analyzing the at least one submitted content item to determine a list of topics associated with the at least one submitted content item;
generating a topic similarity score for the particular member profile based on a comparison of the list of topics and a topic of interest associated with the search request, wherein generating a topic similarity score for the particular member profile based on a comparison of the list of topics and a topic of interest associated with the search request includes:
determining a total number of submitted content items associated with the particular member profile that include the topic of interest associated with the search request;
ranking the list of member profiles based on generated topic similarity scores;
selecting at least one member profile based on the member profile rankings; and
transmitting the selected member profile(s) to a client system for display.

13. The system of claim 12, wherein the search request includes member profile criteria and retrieving a list of member profiles includes identifying members whose characteristics match the member profile criteria.

14. The system of claim 12, wherein the search request includes the topic of interest.

15. The system of claim 12, wherein the search request includes a search query.

16. A non-transitory computer-readable storage medium storing instructions that, when executed by one or more processors of a machine, cause the machine to perform operations comprising:
receiving a search request for at least one member profile;
retrieving a list of member profiles in response to the search request;
for a particular member profile in the list of member profiles:
identifying at least one submitted content item associated with a member of the social networking system and associated with the particular member profile;
analyzing the at least one submitted content item to determine a list of topics associated with the at least one submitted content item;
generating a topic similarity score for the particular member profile based on a comparison of the list of topics and a topic of interest associated with the search request, wherein generating a topic similarity score for the particular member profile based on a comparison of the list of topics and a topic of interest associated with the search request includes determining a percentage of submitted content items associated with the particular member profile that include the topic of interest associated with the search request;
ranking the list of member profiles based on generated topic similarity scores;
selecting at least one member profile based on the member profile rankings; and
transmitting the selected at least one member profile to a client system for display.

17. The non-transitory computer-readable storage medium of claim 16, wherein the search request includes member profile criteria and retrieving a list of member profiles includes identifying members whose characteristics match the member profile criteria.

18. The non-transitory computer-readable storage medium of claim 16, wherein the search request includes the topic of interest.

* * * * *

UNITED STATES PATENT AND TRADEMARK OFFICE
CERTIFICATE OF CORRECTION

PATENT NO.         : 10,459,997 B1
APPLICATION NO.    : 15/705109
DATED              : October 29, 2019
INVENTOR(S)        : Agarwal et al.

It is certified that error appears in the above-identified patent and that said Letters Patent is hereby corrected as shown below:

On the Title Page

Item (54), and in the Specification, Column 1, Line 2, "Title", delete "MEMBERS?" and insert --MEMBERS'-- therefor Signed and Sealed this
Thirty-first Day of March, 2020

Andrei Iancu
*Director of the United States Patent and Trademark Office*